United States Patent
Voss et al.

(10) Patent No.: US 6,832,647 B2
(45) Date of Patent: Dec. 21, 2004

(54) INTEGRATED CONDENSER/SEPARATOR FOR FUEL CELL EXHAUST GASES

(75) Inventors: Mark G. Voss, Franksville, WI (US); Nicholas Siler, Franksville, WI (US); Gregory A. Mross, Franklin, WI (US); Joseph R. Stevenson, Kenosha, WI (US); Alan P. Meissner, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 10/115,194

(22) Filed: Apr. 2, 2002

(65) Prior Publication Data

US 2003/0183374 A1 Oct. 2, 2003

(51) Int. Cl.⁷ .................................................. F25B 9/08
(52) U.S. Cl. ...................................... 165/111; 429/26
(58) Field of Search ......................... 165/110, 111, 165/114; 429/26

(56) References Cited

U.S. PATENT DOCUMENTS

| | | | |
|---|---|---|---|
| 2,084,743 A | * 6/1937 | Rathbun | 165/114 |
| 3,718,506 A | 2/1973 | Fischer et al. | |
| 4,372,759 A | 2/1983 | Sederquist et al. | |
| 4,473,110 A | * 9/1984 | Zawierucha | 165/133 |
| 4,638,852 A | 1/1987 | Basseen et al. | |
| 4,669,530 A | 6/1987 | Warner | |
| 4,808,492 A | * 2/1989 | Uozumi et al. | 429/34 |
| 4,824,740 A | 4/1989 | Abrams et al. | |
| 4,969,507 A | * 11/1990 | Rosenblad | 165/115 |
| 4,973,530 A | 11/1990 | Vanderborgh et al. | |
| 4,994,331 A | 2/1991 | Cohen | |
| 5,144,809 A | * 9/1992 | Chevalier et al. | 165/166 |
| 5,364,604 A | * 11/1994 | Spink et al. | 423/210 |
| 5,547,776 A | 8/1996 | Fletcher et al. | |
| 5,667,005 A | * 9/1997 | Kakutani et al. | 165/114 |
| 5,682,945 A | * 11/1997 | Lehman | 165/111 |
| 5,765,631 A | * 6/1998 | Gerard | 165/166 |
| RE36,148 E | 3/1999 | Strasser | |
| 5,964,280 A | 10/1999 | Wehrmann et al. | |
| 6,015,634 A | 1/2000 | Bonville, Jr. et al. | |
| 6,073,685 A | * 6/2000 | Gerard et al. | 165/111 |
| 6,189,338 B1 | * 2/2001 | Lehman | 62/643 |

* cited by examiner

Primary Examiner—Allen J Flanigan
(74) Attorney, Agent, or Firm—Wood, Phillips, Katz, Clark & Mortimer (57) ABSTRACT

An integrated condenser/separator (10) is provided for condensing and separating a condensate (11) from a cathode exhaust gas flow (12) in a fuel cell system (14). The condenser/separator includes a housing (16) and one or more baffle plates (18, 20) positioned in the housing (16) to divide the interior of the housing (16) into two or more gas flow chambers (24, 26, 28) each containing a stack (32, 34, 36) of heat exchange units (30). A condensate drain (106, 108) is provided in each of the gas flow chambers (24, 26) to drain condensate therefrom. The condenser/separator (10) can be configured into any reasonable and independent number of coolant and gas side passes as maybe required to meet the thermodynamic and pressure drop requirements of each particular application.

22 Claims, 9 Drawing Sheets

INTEGRATED CONDENSER/SEPARATOR FOR FUEL CELL EXHAUST GASES

FIELD OF THE INVENTION

This invention relates to heat exchangers and liquid/gas separators, and more particularly, to condensers and liquid/gas separators which are used together for separating a condensate from a gas flow in a fuel cell system.

BACKGROUND OF THE INVENTION

It is known to employ a condenser in a fuel cell system to condense water from the cathode exhaust gas flow, in combination with a liquid/gas separator downstream of the condenser to separate the condensed water from the cathode exhaust gas flow after it has passed through the condenser. The recovery of water from the cathode exhaust gas flow is desirable because the water can then be used for the purpose of humidifying the fuel cell inlet gases, performing evaporative cooling of inlet gases, and/or supplying water for the various chemical reactions that occur within a hydrocarbon fuel processing system. U.S. Pat. No. 6,015,634 issued Jan. 18, 2000 to Bonville, Jr. et al. shows one example of a fuel cell system employing a condenser and liquid/gas separator. It is also known to employ condensers and liquid/gas separators to separate an electrolyte, since its phosphoric acid, from a gas flow in a fuel cell system. U.S. Pat. No. 4,372,759 issued Aug. 28, 1981 to Sederquist et al. shows one example of such a system. While conventional systems may be suitable for their intended purpose, there is always room for improvement.

For example, because fuel cells offer advantages in efficiency and in emission, interest in utilizing fuel cells as electricity generating plants and/or as a power source for vehicles has been increasing as concerns grow over the supply of fossil-fuel and the environmental effects of conventional fossil-fuel power sources, such as internal combustion engines for vehicles. However, improvements in affordability and compactness may be required before fuel cells become acceptable for widespread usage, particularly in vehicles.

SUMMARY OF THE INVENTION

It is the principle object of the invention to provide a new and improved integrated condenser/separator for fuel cell exhaust gas.

It is another object of the invention to provide a relatively compact construction for a condenser and liquid/gas separator for fuel cell exhaust gas.

An exemplary embodiment of the invention achieves at least some of the foregoing objects in an integrated condenser/separator for condensing and separating a condensate from a cathode exhaust gas flow in a fuel cell system. The condenser/separator includes a housing, a baffle plate positioned in the housing to divide the interior of the housing into a first gas flow chamber and a second gas flow chamber, and a plurality of heat exchange units arranged as a first stack of the heat exchange units positioned in the first gas flow chamber and a second stack of the heat exchanger units positioned in the second gas flow chamber. The housing includes a gas flow inlet, a gas flow outlet, a condensate outlet, a coolant inlet, and coolant outlet. A coolant opening is provided in the baffle plate to allow a flow of coolant through the baffle plate, a gas flow opening is provided in the baffle plate to allow a gas flow through the baffle plate. A first condensate drain is provided in the first gas flow chamber to drain condensate from the first gas flow chamber. The first stack of heat exchange units includes a first plurality of coolant channels interleaved with a first plurality of gas flow channels, a first inlet manifold to direct coolant into the first plurality of coolant channels, a first outlet manifold to receive coolant from the first plurality of coolant channels, and a first gas flow manifold to communicate gas flow with the first plurality of gas flow channels. The second stack includes a second plurality of coolant channels interleaved with a second plurality of gas flow channels, a second inlet manifold to direct coolant into the second plurality of coolant channels, a second outlet manifold that receives coolant from the second plurality of coolant channels, and a second gas flow manifold to communicate gas flow with the second plurality of gas flow channels.

According to one embodiment, the first or second gas flow manifolds are aligned with the gas flow openings in the baffle plate so that the gas flow makes one pass through the first plurality of gas flow channels and another pass through the second plurality of gas flow channels.

In one embodiment, the gas flow inlet opens into the first gas flow chamber, and the first and second gas flow manifolds are aligned with the gas flow openings in the baffle plate so that the gas flow makes a first pass from the first gas flow chamber through the first plurality of gas flow channels to the first gas flow manifold, flows from the gas flow manifold to the second gas flow manifold, and makes a second pass from the second gas flow manifold through the second plurality of second gas flow channels to the second gas flow chamber.

According to one embodiment, a coalescing member is positioned upstream of the first and second plurality of gas flow channels.

In one embodiment, the integrated condenser/separator further includes a condensate manifold in fluid communication with the condensate outlet and the first condensate drain to direct condensate from the condensate drain to the condensate outlet. According to a further embodiment, the condensate manifold includes a wall that surrounds at least part of the first and second gas flow chambers to define an exterior surface of the housing.

According to one embodiment, the second outlet manifold and the first inlet manifold are aligned with the coolant opening in the baffle plate to allow coolant flow from the second outlet manifold to the first inlet manifold so that the coolant makes a pass through the second plurality of coolant channels and an additional pass through the first plurality of coolant channels.

In one embodiment, the baffle plate has an additional coolant opening, the first and second inlet manifolds are aligned with one of the coolant openings in the baffle plate to allow coolant flow between the first and second inlet manifolds, and the first and second outlet manifolds are aligned with the other coolant openings in the baffle to allow coolant flow between the first and second outlet manifolds.

According to one embodiment, each of the heat exchange units includes a pair of plates sealingly joined at peripheral edges to define a coolant channel in each of the heat exchange units, and the heat exchange units are spaced from each other to define the gas flow channels between the heat exchange units. Further, the heat exchange units include respective sets of interconnected openings defining the inlet manifolds, the outlet manifolds, and the gas flow manifolds.

In one embodiment, the integrated condenser/separator further includes a second baffle plate positioned in the housing to divide the interior of the housing into a third gas flow chamber adjacent to the second gas flow chamber, a second condensate drain in the second gas flow chamber to drain condensate from the second gas flow chamber, and a third stack of heat exchange units positioned in the third gas flow chamber. The second baffle plate has a second coolant opening to allow a flow of coolant through the second baffle plate, and a second gas flow opening to allow a gas flow through the second baffle plate. The third stack includes a third plurality of coolant channels interleaved with a third plurality of gas flow channels, a third inlet manifold to direct coolant into the third plurality of coolant channels, a third outlet manifold to receive coolant from the third plurality of coolant channels, and a third gas flow manifold to communicate gas flow with a third plurality of gas flow channels.

According to a further embodiment, the gas flow inlet opens into the first gas flow chamber, the first and second gas flow manifolds are aligned with the gas flow opening in the first baffle plate, and the third gas flow manifold is blocked by an imperforate portion of the second baffle plate so that the gas flow makes a first pass from the first gas flow chamber through the first plurality of gas flow channels to the first gas flow manifold, flows from the first gas flow manifold to the second gas flow manifold, makes a second pass from the second gas flow manifold through the second plurality of gas flow channels, flows through the gas flow opening in the second baffle plate to the third gas flow chamber, and makes a third pass from the third gas flow chamber through the third plurality of gas flow channels to the third gas flow manifold.

Other objects and advantages will become apparent from the following specification taken in connection with accompanying drawings.

DETAILED DESCRIPTION OF THE PREFERRED EMBODIMENTS

Figure 1:
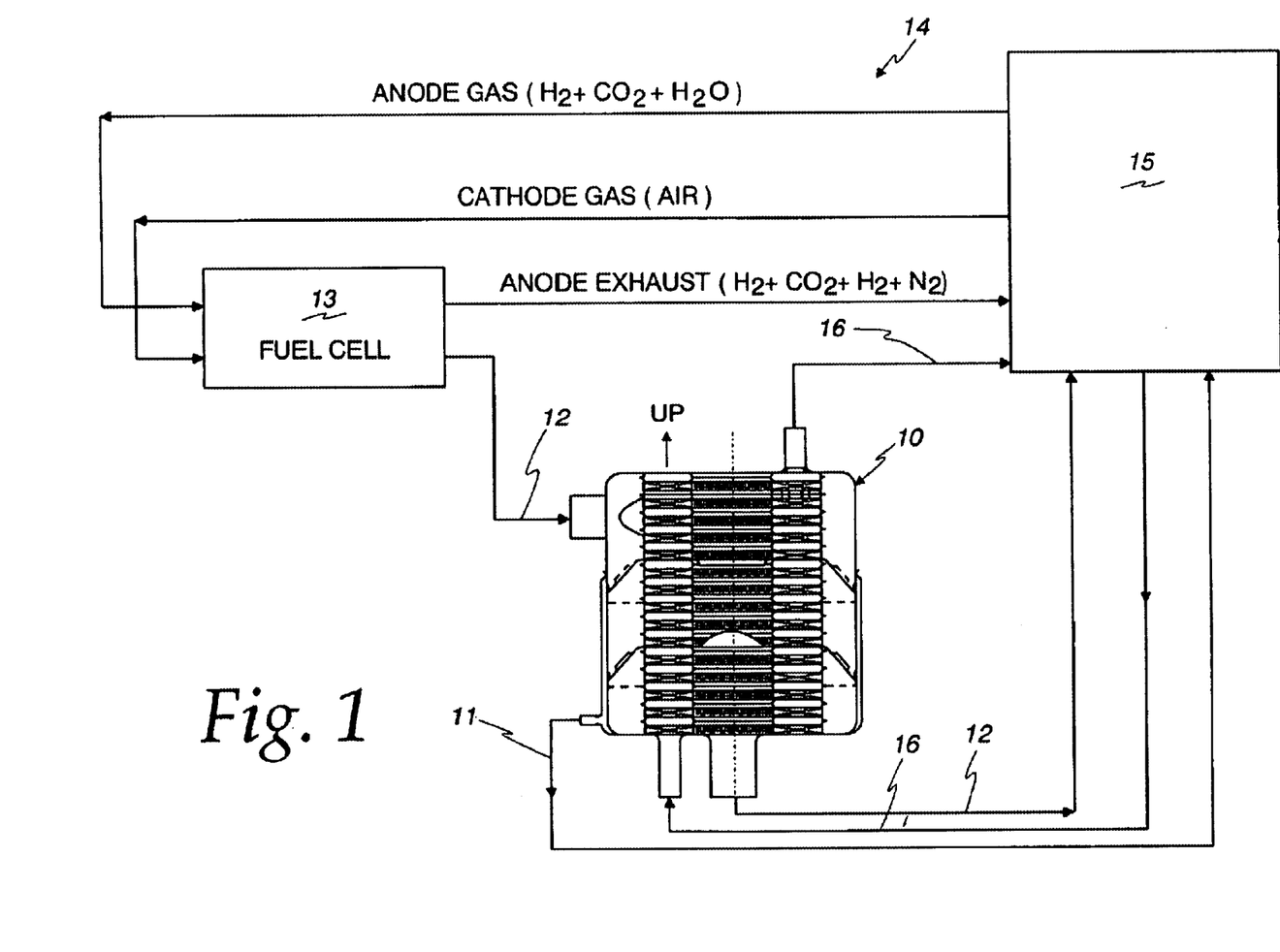
FIG. 1 is a diagrammatic representation of a fuel cell system employing a condenser/separator embodying the present invention.

As best seen in FIG. 1, an integrated condenser/separator 10 is provided for condensing and separating a condensate 11 from a cathode exhaust gas flow 12 of a fuel cell stack 13 in a fuel cell system 14. Assuming that the condensate 11 is water, the separated condensate 11 can be used for the purpose of humidifying the fuel cell inlet gasses, performing evaporative cooling of inlet gasses, and/or supplying water for the various chemical reactions that occur within a hydrocarbon fuel processing system, as discussed in the Background of the Invention section of the present application. The condenser/separator 10 receives a flow of coolant 16 from the fuel cell system 14 for cooling the cathode exhaust gas flow 12. After heat is rejected from the cathode exhaust gas 12 to the coolant 16, the coolant is returned to the fuel cell system 14. Because the remaining components of the system 14 are not critical to the understanding of the invention, and because there are many well known and conventional forms of components that can be used with the fuel cell system 14, the remainder of the components that operate with the fuel cell system 14 are not illustrated in detail and are shown only diagrammatically at 15. For vehicular applications, the components 15 will typically include a water tank, a methanol tank, a fuel vaporizer, a reformer and catalytic burner, a gas purification reactor, and a compressor/expander, all of which are known. Electric power generated by the fuel cell stack 13 is employed, during operation, to drive pumps, motors, etc. within the system as well as to provide electric power for a load to be driven by the system. In the case of vehicular propulsion system, the load will typically be a motor coupled to the vehicle traction system.

Figure 2:
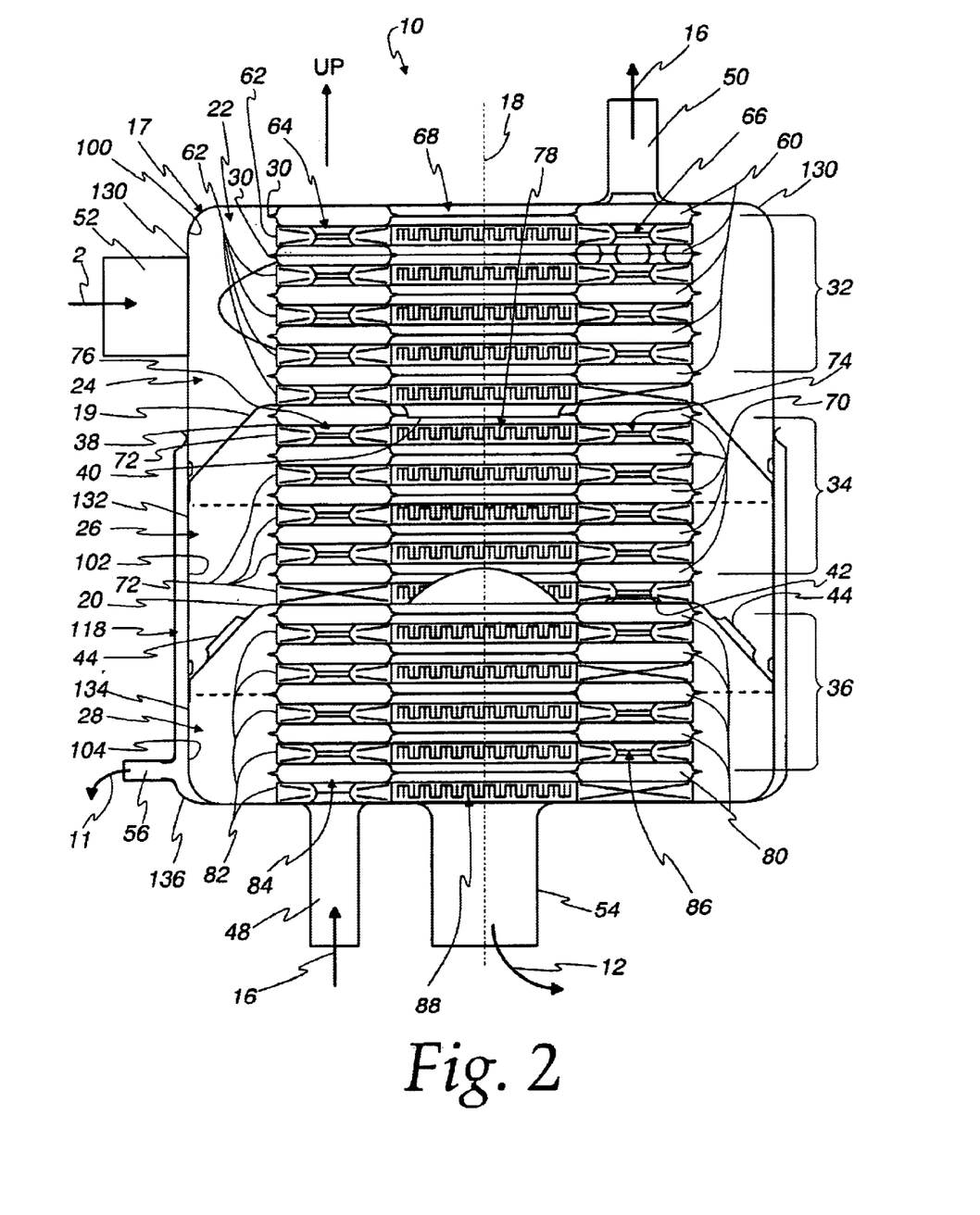
FIG. 2 is somewhat diagrammatic cross sections of the condenser/separator shown in FIG. 1.

As best seen in FIG. 2, the condenser/separator 10 includes a housing 17 centered about a vertical axis 18; first and second baffle plates 19 and 20 positioned in the housing 17 to divide the interior 22 of the housing 17 into first, second, and third gas flow chambers 24, 26, and 28; and a plurality of heat exchange units 30 arranged as a first stack 32 of the heat exchange units 30 positioned in the first gas flow chamber 24, a second stack 34 of the heat exchange units 30 positioned in the second gas flow chamber 26, and a third stack 36 of the heat exchange units 30 positioned in the third gas flow chamber 28. The first baffle plate 19 has a first coolant opening 38 to allow a flow of the coolant 16 through the baffle plate 19, and a gas flow opening 40 preferably centered in the baffle plate 19 to allow the gas flow 12 through the baffle plate 19. The second baffle plate 20 has a coolant opening 42 to allow the flow of coolant through the baffle plate 20, and preferably a plurality of upwardly flanged gas flow openings 44 equally spaced about an outer rim of the baffle plate 20 to allow the gas flow 12 through the baffle plate 20.

The housing 17 includes a coolant inlet 48 directing the coolant 16 into the condenser/separator 10, a coolant outlet 50 for directing the coolant 16 away from the condenser/separator 10, a gas flow inlet 52 for directing the gas flow 12 into the condenser/separator 10, a gas flow outlet 54 for directing the gas flow 12 from the condenser/separator 10, and a condensate outlet 56 for directing the condensate 11 from the condenser/separator 10.

The first stack 32 of the heat exchange units includes a first plurality of coolant channels 60 interleaved with a first plurality of gas flow channels 62, a first inlet manifold 64 to direct the coolant 16 into the first plurality of coolant channels 60, a first outlet manifold 66 to receive the coolant 16 from the first plurality of coolant channels 60, and a first gas flow manifold 68 to communicate the gas flow 12 with the first plurality of gas flow channels 62. The second stack 34 includes a second plurality of coolant channels 70 interleaved with a second plurality of gas flow channels 72, a second inlet manifold 74 to direct the coolant 16 into the second plurality of coolant channels 70, a second outlet manifold 76 that receives the coolant 16 from the second plurality of coolant channel 70, and a second gas flow manifold 78 to communicate the gas flow 12 with the second plurality of gas flow channels 72. The third stack 36 includes a third plurality of coolant channels 80 interleaved with a third plurality of gas flow channels 82, a third inlet manifold 84 to direct the coolant 16 into the third plurality of coolant channels 80, a third outlet manifold 86 to receive the coolant 16 from the third plurality of coolant channel 80, and a third gas flow manifold 88 to communicate the gas flow 12 with the third plurality of gas flow channels 82.

Figure 3:
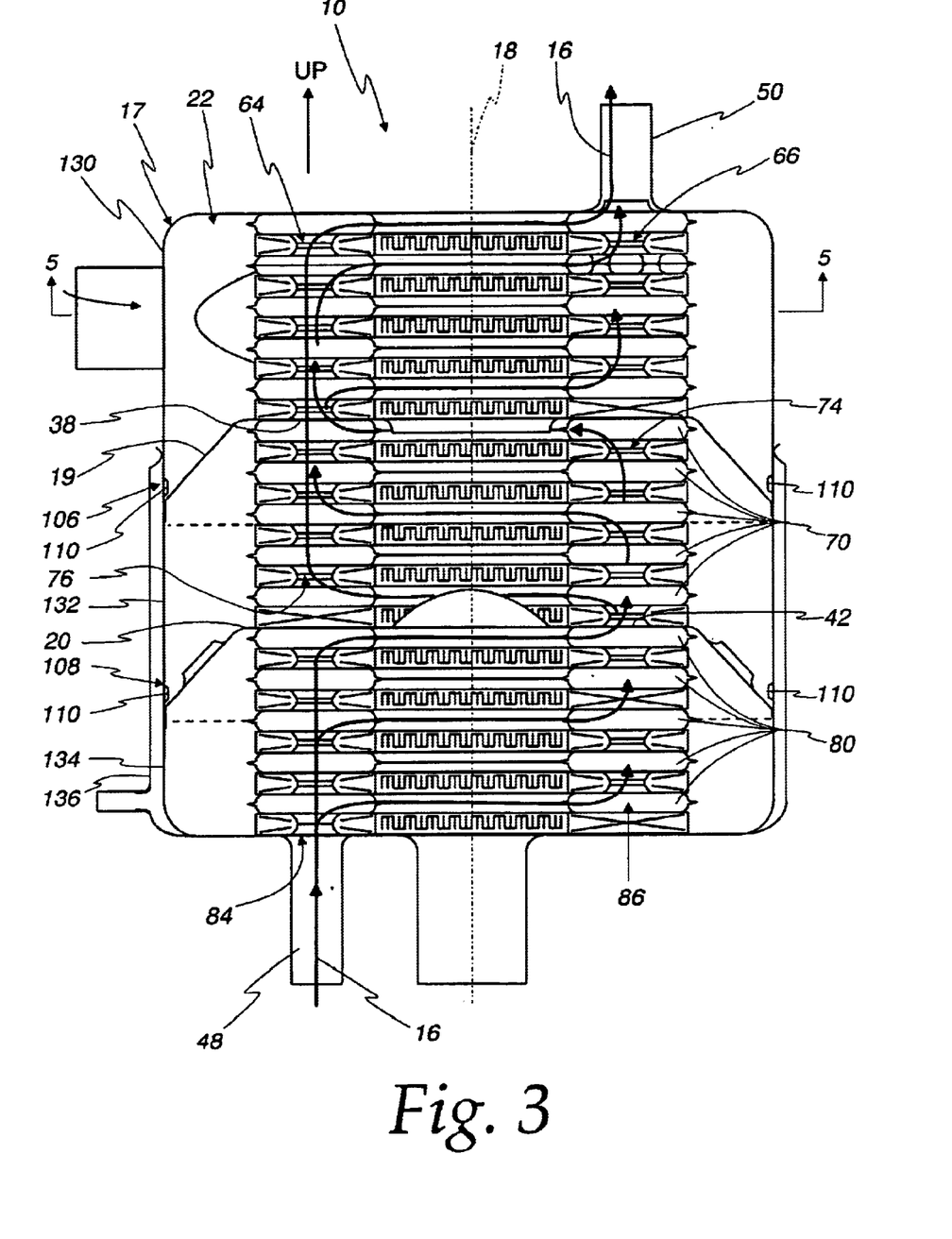
FIG. 3 is a view similar to FIG. 2 illustrating the flow pattern of a coolant through the condenser/separator.

As best seen in FIG. 3, the coolant inlet 48 is aligned with and sealingly connected to the third inlet manifold 84 so that the coolant 16 is directed into the third inlet manifold 84, then makes a first pass through the third plurality of coolant channels 80 to the third outlet manifold 86, as shown by the arrowed lines in FIG. 3. The third outlet manifold 86 and the second inlet manifold 74 are aligned with the coolant opening 42 in the baffle plate 20 that the coolant 16 flows from the third outlet manifold 86 to the second inlet manifold 74 and makes a second pass from the second inlet manifold 74 through the second plurality of coolant channels 70 to the second outlet manifold 76. The second outlet manifold 76 and the first inlet manifold 64 are aligned with the coolant opening 38 in the baffle plate 19, and the first outlet manifold 66 is aligned with and sealingly connected to coolant outlet 50 so that the coolant 16 flows from the second outlet manifold 76 to the first inlet manifold 64, makes a third pass from the first inlet manifold 64 through the first plurality of coolant channels 60 to the first outlet manifold 66, and exits the condenser/separator 10 through the coolant outlet 50.

In an alternate embodiment, the flow of the coolant through the condenser/separator 10 can be reversed by reversing the function of the coolant inlet 48 and the coolant outlet 50 so that the coolant 16 enters the condenser/separator 10 through the coolant outlet 50 and exits the condenser/separator 10 through the coolant inlet 48.

Figure 4:
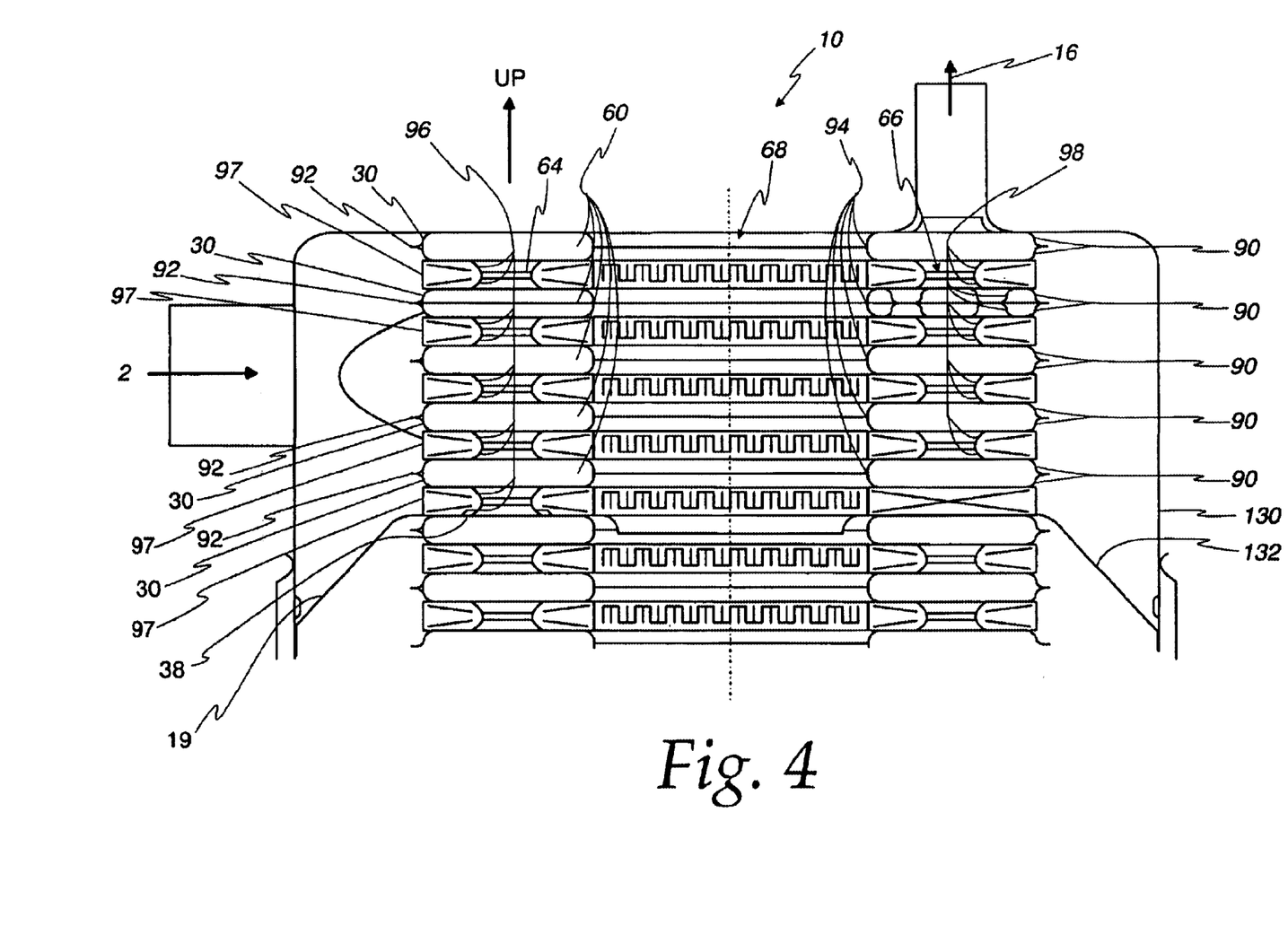
FIG. 4 is an enlarged view of the upper portion of the condenser/separator shown in FIG. 2.

As best seen in FIG. 4, preferably, each of the heat exchange units 30 comprises a pair of plates 90 sealing joined at their peripheral edges 92 to define one of the coolant channels 60, 70, 80 in each of the heat exchange units 30. Preferably, each of the plates 90 is disc shaped with the peripheral edges 92 being substantially circular in shape. Each of the plates 90 includes a centrally located opening 94 that is sealingly joined with the opening 94 of the other plate 90 of the pair to define the respective gas flow manifolds 68, 78, and 88 of the first, second and third stack 32, 34, and 36. Additionally, each of the plates 90 includes first and second flanged openings 96 and 98, with each of the first flanged openings 96 being sealingly joined to a flanged opening 96 of an adjacent heat exchange unit 30 to define the respective first, second, and third inlet manifolds 64, 74, and 84, and each of the second flanged openings 98 being connected with a flanged opening 98 of the adjacent heat exchange unit 30 to define the respective first, second and third outlet manifolds 66, 76, and 86. It should be understood that the top most plate 90 in the first stack 32 has only the flanged opening 98 which is aligned with the coolant outlet 50, the bottom most plate 90 in the first stack 32 and the top most plate 90 in the second stack 34 have only the flanged openings 96 which are aligned with the coolant opening 38 in the baffle plate 19, the bottom most plate 90 in the second stack 34 and the top most plate 90 in the third stack 36 have only the flanged openings 98 which are aligned with the coolant opening 42 in the baffle plate 20, and the bottom most plate 90 in the third stack 36 has only the flanged opening 96 which is aligned with the coolant inlet 48. Preferably, suitable fins 97, such as lanced and offset fins, are provided in the gas flow channels 62, 72 and 82 between each of the heat exchange units 30. Alternatively, dimples formed in the plates 90 can be substituted for the fins 97. Additionally, suitable turbulators, such as dimples 98 formed in the plates 90 or lanced and offset fins may be provided in each of the coolant flow channels 60, 70, and 80. It should be understood that there are many known forms for the heat exchange units 30 and the plates 90, especially in the so called "donut oil cooler" art and the exact form of the plates 90 will be highly dependent upon the specific parameters of each application.

Figure 5:
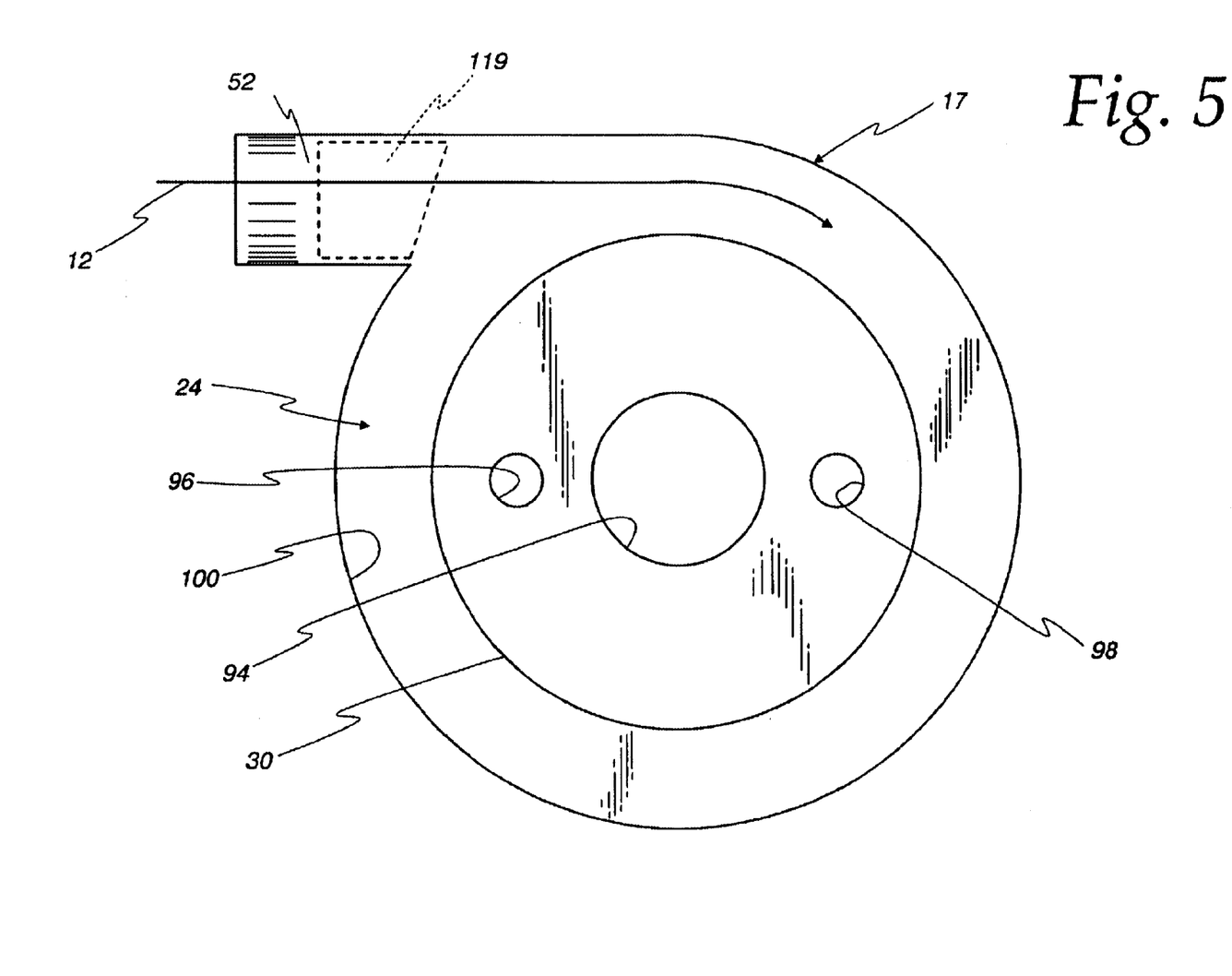
FIG. 5 is a view taken along line 5—5 in FIG. 3.
Figure 6:
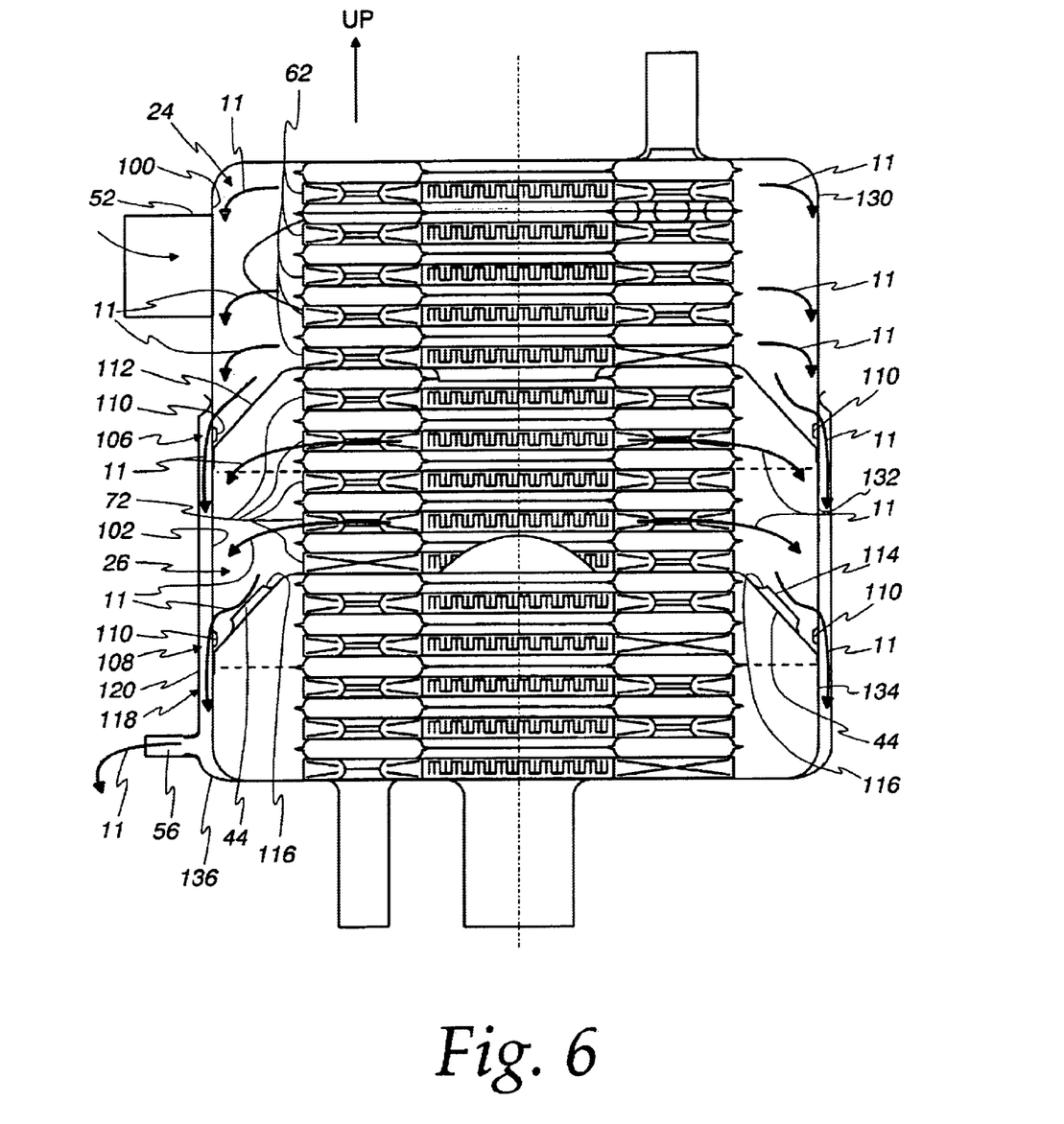
FIGS. 6 and 7 are views similar to FIGS. 2 and 3 showing the flow patterns of a condensate and a gas flow, respectively, through the condenser/separator.

Preferably, each of the first, second and third gas flow chambers 24, 26, and 28 are bounded by respective cylindrical sidewalls 100, 102, and 104, and, as best seen in FIG. 5, the gas flow inlet 52 directs the gas flow 12 tangentially along the sidewall 100 into the first gas flow chamber 24 so that the gas flow 12 circulates about the axis 18 to help centrifuge condensate 11 from the gas flow 12. As seen in FIG. 6, first and second condensate drains 106 and 108 are provided in the first and second gas flow chambers 24 and 26 respectively. Preferably, each of the drains 106, 108 is provided in the form of a plurality of equally spaced openings 110 formed through the respective sidewalls 100 and 102. It is also preferred that each of the baffle plates 19, 20 include a downwardly directed, cone shaped outer rim 112, 114 so that condensate 11 drains from the respective gas flow channels 62, 72 to the first and second condensate drains 106, 108. In this regard, it should be noted that each of the openings 44 include an upwardly extending flange 116 to restrict the flow of condensate 11 through the openings 44. A condensate manifold 118 is defined by a cylindrical wall 120 that surrounds at least the portions of the walls 100 and 102 that include the openings 110 for the drains 106, 108 so that the condensate 11 is directed from the drains 106, 108 through the manifold 118 to the condensate outlet 56, as shown by the arrowed lines in FIG. 6. As shown by the broken lines in FIG. 5, a coalescing pad or member 119 can optionally be provided in the gas flow limit 52 to remove condensate that is already contained in the gas flow 12 prior to the gas flow 12 entering the plurality of gas flow channel 62.

Figure 7:
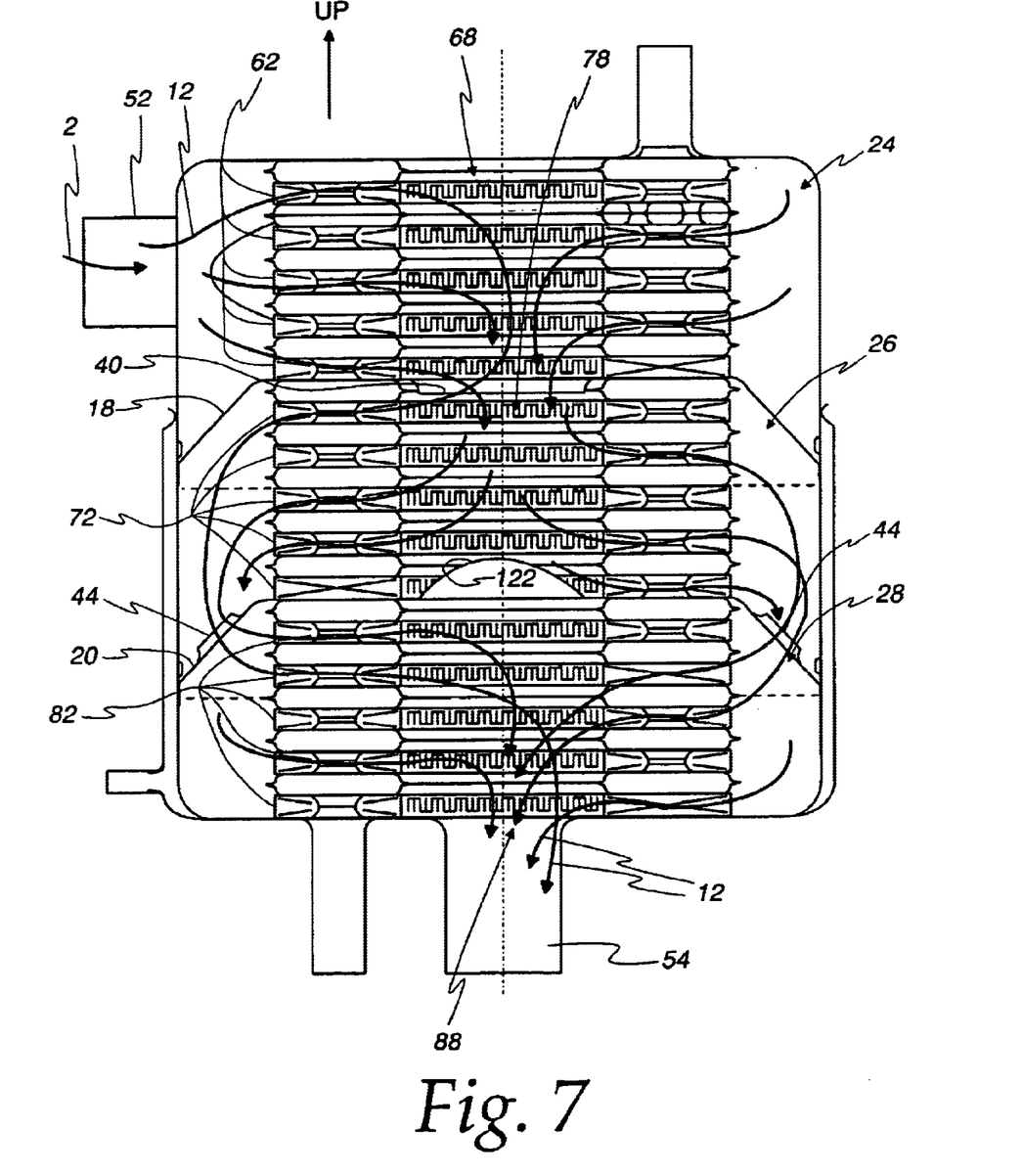

As best seen in FIG. 7, the first gas flow manifold 68 and the second gas flow manifold 78 are aligned with the gas flow opening 40 in the baffle plate 19 so that the gas flow 12 makes a first pass from the first gas flow chamber 24 through the first plurality of gas flow channels 62 to the first gas flow manifold 68, flows from the first gas flow manifold 68 to the second gas flow manifold 78, and then makes a second pass from the second gas flow manifold 78 through the second plurality of gas flow channels 72 to the second gas flow chamber 26, as shown by the arrowed lines in FIG. 7. Flow from the second gas flow manifold 78 to the third gas flow manifold 88 is blocked by an imperforate portion 122 of the second baffle plate 20, which is preferably dome shaped to assist in directing the gas flow 12 through the second plurality of gas flow channels 72. The gas flow outlet 54 is aligned with the third gas flow manifold 88 so that the gas flow 12 passes through the plurality of gas flow openings 44 in the second baffle plate 20 into the third gas flow chamber 28, makes a third pass through the third plurality of gas flow channels 88 to the third gas flow manifold 88, and exits the condenser/separator 10 via the gas flow outlet 54.

Figure 8:
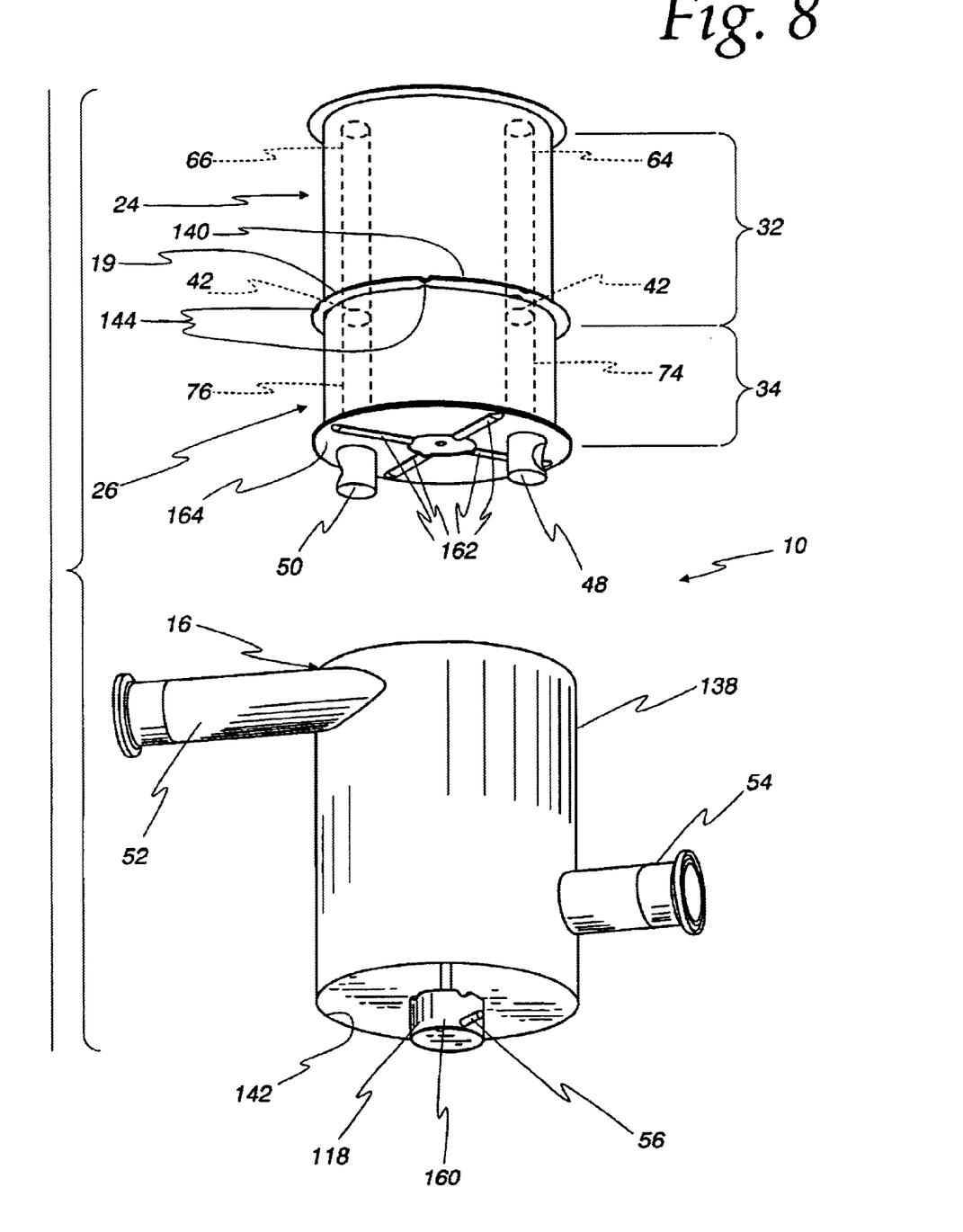
FIG. 8 is a somewhat diagrammatic perspective view of another embodiment of a condenser/separator according to the invention.
Figure 9:
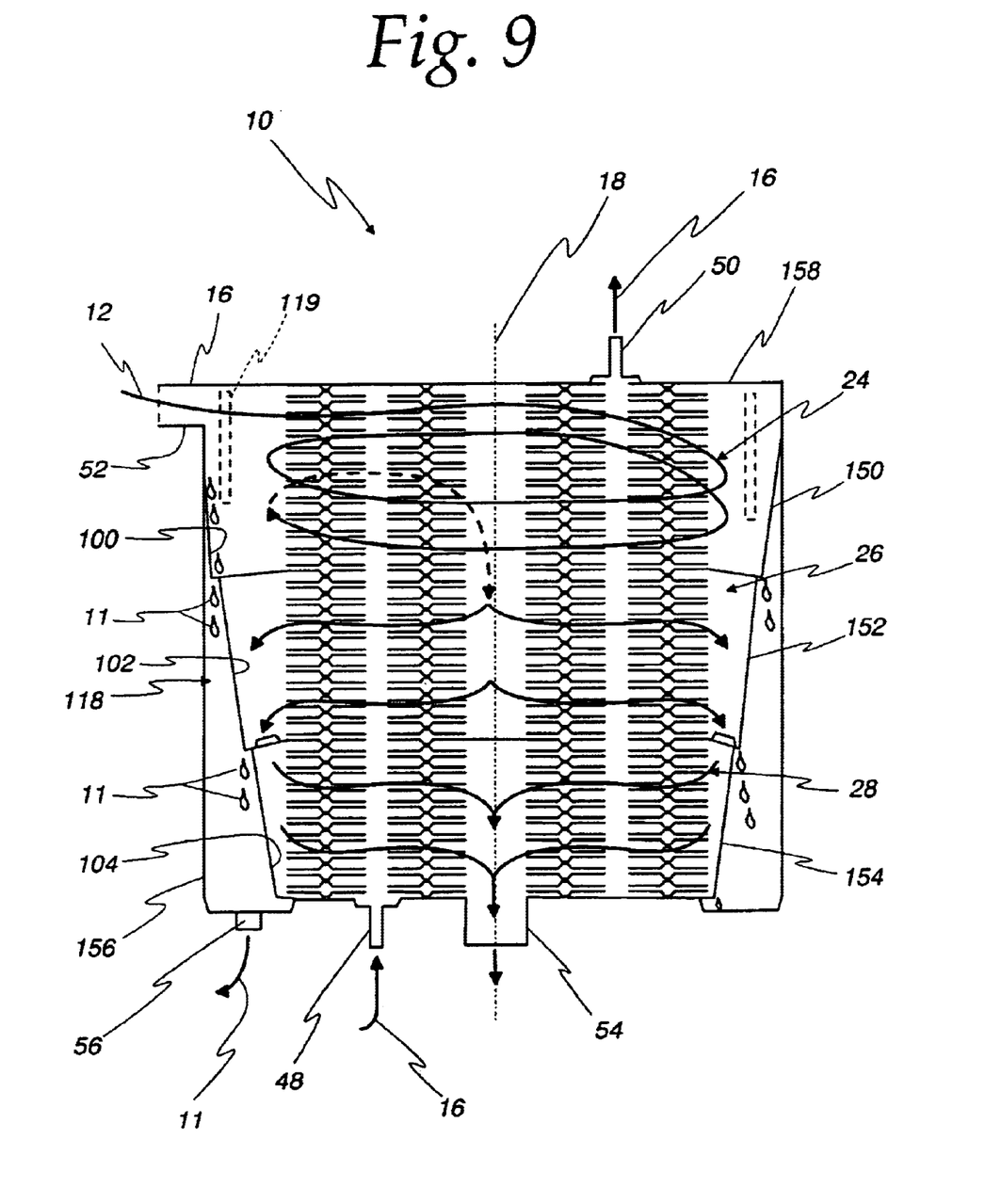
FIG. 9 is a somewhat diagrammatic cross sectional view of another embodiment of a condenser/separator according to the invention.

Having described one preferred embodiment of the condenser/separator 10, it should be appreciated that a number of modifications are possible according to the invention. For example, while FIGS. 1 through 7 show an equal number of heat exchange units 30 in the three gas flow chambers 24, 26, and 28, it may be desirable in some applications for there to be an unequal number of the heat exchange units 30 in one or more of the gas flow chambers 24, 26, and 28. As another example, while the condenser/separator 10 shown in FIGS. 1–5 has three gas flow chambers 24, 26, and 28 and three stacks 32, 34 and 36 of the heat exchange units 30, it may be desirable in some applications to have more than, or less than three gas flow chambers and associated stacks of heat exchanger units 30. FIG. 8 shows one example of a condenser/separator 10 having only two gas flow chambers 24, 26 and two stacks 32, 34 of the heat exchange units 30, rather than three, as well as an unequal number of the heat exchange units 30 in each of the stacks 32 and 34 (heat exchange units are shown only schematically). As yet another example, while the condenser/separator 10 in FIGS. 1–7 show a three pass arrangement for the coolant flow 16 through the condenser/separator 10, it may be desirable of some applications for there to be more than, or fewer than three passes of coolant flow 16 through the condenser/separator 10. For example, in some applications it may be desirable for all of the inlet manifolds of the individual stacks of the heat exchanger units 30 to be aligned with each other, and all of the outlet manifolds of the individual stacks of the heat exchanger units 30 to be aligned with each other so that the coolant is directed into the aligned inlet manifolds, makes a single pass through the coolant flow channels to the aligned outlet manifolds, and exits the condenser/separator 10 via the coolant outlet 50. Again, this option is shown in FIG. 8 which includes an additional coolant opening 42 in the baffle plate 19. As yet another example, while the condenser/separator 10 in FIGS. 1–7 shows the main body of the housing 17 being a four piece nested construction, with three inverted cup shaped pieces 130, 132 and 134 defining the first second and third gas flow chambers 24, 26 and 28, the baffle plates 19 and 20 being unitary parts of the cups pieces 132 and 134, respectively and an upwardly opening cup shaped piece 136 defining the condensate manifold 118, and the bottom of the housing 17, many other constructions are possible. For example, as shown in FIG. 8, the main body of the housing 17 could be provided by an opened ended can shaped member 138, with one or more of the baffle plates 19, 20 being defined by a disk shaped member 140 that engages a cylindrical interior wall 142 of the can shaped member 138, and with the drain openings 110 being provided by cut-outs 144 in the periphery of the disk shaped members 140 to allow the condensate to drain down the wall 142. Another example of a possible housing modification is shown in FIG. 9 wherein the main body of the housing 17 is defined by three upwardly opening cup shaped members 150, 152 and 154 that define the gas flow chambers 24, 26 and 28, respectively, a fourth upwardly opening member 156 that defines the condensate manifold 118, and a lid 158. In this embodiment, the sidewalls 100, 102, 104 each have a downwardly converging conical shape instead of a cylindrical shape 158. It is believed that the downwardly converging conical shape may assist in the separation of the condensate 11 from the gas flow 12. As another example, the coalescing member 119 could be provided inside the first gas flow chamber 24 surrounding the heat exchange units 30, rather then in the gas flow inlet 52. Such a construction is shown by the cylindrical coalescing member 19 shown by broken lines in FIG. 9. As yet another example, the condensate manifold 118 could be provided by an inverted cup 160 that is fed condensate by channels 162 formed in a bottom 164 of the housing 17, such as is shown in FIG. 8.

Preferably, the components of the condenser/separator 10 are formed from a suitable material, such as aluminum, with the components being sealing connected by a suitable bonding method, such as brazing, as is well known from the "donut oil cooler" art.

It should be understood that by integrating the condenser and liquid gas separator, the condenser/separator 10 can provide a compact solution in comparison to conventional systems that employ separate devices.

It should also be understood that by providing individual stacks of the heat exchange units and one or more baffle plates with appropriate flow openings, the condenser/separator 10 can be configured into any reasonable and independent number of coolant and gas sight passes as may be required to meet the thermal dynamic and pressure drop requirements of each particular application.

We claim:

1. An integrated condenser/separator for condensing and separating a condensate from a cathode exhaust gas flow in a fuel cell system, the condenser/separator comprising:
    a housing including a gas flow inlet, a gas flow outlet, a condensate outlet, a coolant inlet, and a coolant outlet;
    a baffle plate positioned in the housing to divide an interior of the housing into a first gas flow chamber and a second gas flow chamber, the baffle plate having a coolant opening to allow a flow of coolant through the baffle plate and a gas flow opening to allow a gas flow through the baffle plate;
    a first condensate drain in the first gas flow chamber to drain condensate from the first gas flow chamber; and
    a plurality of heat exchange units arranged as a first stack of the heat exchange units positioned in the first gas flow chamber and a second stack of the heat exchange units positioned in the second gas flow chamber,
    the first stack including a first plurality of coolant channels interleaved with a first plurality of gas flow channels, a first inlet manifold to direct coolant into the first plurality of coolant channels, a first outlet manifold to receive coolant from the first plurality of coolant channels, and a first gas flow manifold to communicate gas flow with the first plurality of gas flow channels,
    the second stack including a second plurality of coolant channels interleaved with a second plurality of gas flow channels, a second inlet manifold to direct coolant into the second plurality of coolant channels, a second outlet manifold that receives coolant from the second plurality of coolant channels, and a second gas flow manifold to communicate gas flow with the second plurality of gas flow channels.

2. The integrated condenser/separator of claim 1 wherein the first and second gas flow manifolds are aligned with the gas flow opening in the baffle plate whereby the gas flow makes one pass through the first plurality of gas flow channels and another pass through the second plurality of gas flow channels.

3. The integrated condenser/separator of claim 2 wherein the gas flow inlet opens into the first gas flow chamber whereby the gas flow makes a first pass from the first gas flow chamber through the first plurality of gas flow channels to the first gas flow manifold, flows from the first gas flow manifold through the gas flow opening to the second gas flow manifold, and makes a second pass from the second gas flow manifold through the second plurality of gas flow channels to the second gas flow chamber.

4. The integrated condenser/separator of claim 1 wherein the housing comprises cylindrical side walls surrounding the peripheries of the first and second stack of heat exchanger units.

5. The integrated condenser/separator of claim of claim 1 further comprising a coalescing member positioned upstream of the first and second plurality of gas flow channels.

6. The integrated condenser/separator of claim 1 further comprising:
a condensate manifold in fluid communication with the condensate outlet and the first condensate drain to direct condensate from the condensate drain to the condensate outlet.

7. The integrated condenser/separator of claim 6 wherein the condensate manifold comprises a wall that surrounds at least parts of the first and second gas flow chambers to define an exterior surface of the housing.

8. The integrated condenser/separator of claim 1 wherein said housing comprises a first downwardly converging conical side wall surrounding the periphery of the first stack of heat exchanger units, and a second downwardly converging conical side wall surrounding the periphery of the second stack of heat exchanger units.

9. The integrated condenser/separator of claim 1 wherein the second outlet manifold and the first inlet manifold are aligned with the coolant opening in the baffle plate to allow coolant flow from the second outlet manifold to the first inlet manifold whereby the coolant makes a pass through the second plurality of coolant channels and an additional pass through the first plurality of coolant channels.

10. The integrated condenser/separator of claim 1 wherein:
the baffle plate has an additional coolant opening;
the first and second inlet manifolds are aligned with one of the coolant opening in the baffle plate to allow coolant flow between the first and second inlet manifolds,
the first and second outlet manifolds are aligned with the other coolant opening in the baffle plate to allow coolant flow between the first and second outlet manifolds.

11. The integrated condenser/separator of claim 1 further comprising:
a second baffle plate positioned in the housing to divide the interior of the housing into a third gas flow chamber adjacent the second gas flow chamber, the second baffle plate having a second coolant opening to allow a flow of coolant through the second baffle plate and a second gas flow opening to allow a gas flow through the second baffle plate;
a second condensate drain in the second gas flow chamber to drain condensate from the second gas flow chamber; and
a third stack of the heat exchange units positioned in the third gas flow chamber, the third stack including a third plurality of the coolant channels interleaved with a third plurality of gas flow channels, a third inlet manifold to direct coolant into the third plurality of coolant channels, a third outlet manifold to receive coolant from the third plurality of coolant channels, and a third gas flow manifold to communicate gas flow with the third plurality of gas flow channels.

12. An integrated condenser/separator for condensing and separating a condensate from a cathode exhaust gas flow in a fuel cell system, the condenser/separator comprising:
a housing having an interior, an exterior, a gas flow inlet, a gas flow outlet, a condensate outlet, a coolant inlet, and a coolant outlet;
a baffle plate positioned in the housing to divide the interior of the housing into a first gas flow chamber and a second gas flow chamber, the baffle plate having first and second coolant openings to allow a flow of coolant through the baffle plate, and a gas flow opening to allow a gas flow through the baffle plate;
a first condensate drain in the first gas flow chamber to drain condensate from the first gas flow chamber; and
a plurality of heat exchange units arranged as a first stack of the heat exchange units positioned in the first gas flow chamber and a second stack of the heat exchange units positioned in the second gas flow chamber;
each heat exchange unit comprising a pair of plates sealing joined at peripheral edges to define a coolant channel in each said unit, the first stack having a first plurality of the coolant channels and the second stack having a second plurality of the coolant channels,
the heat exchange units being spaced from each other to define a plurality of gas flow channels between the heat exchange units, the first stack having a first plurality of the gas flow channels between the heat exchange units, the first stack having a first plurality of the gas flow channels interleaved with the first plurality of coolant channels, the second stack having a second plurality of the gas flow channels interleaved with the second plurality of coolant channels;
the heat exchange units of the first stack having respective sets of interconnected openings defining a firs inlet manifold to direct coolant into the first plurality of coolant channels and a first outlet manifold to receive coolant from the first plurality of coolant channels,
the heat exchange units of the second stack having respective sets of interconnected openings defining a second inlet manifold to direct coolant into the second plurality of coolant channels and a second outlet manifold that receives coolant from the second plurality of coolant channels,
the first and second inlet manifolds aligned with the first coolant opening in the baffle plate to allow coolant flow between the first and second inlet manifolds,
the first and second inlet manifolds aligned with the first coolant opening in the baffle plate to allow coolant flow between the first and second inlet manifolds,
the first and second outlet manifolds aligned with the second coolant opening in the baffle plate to allow coolant flow between the first and second outlet manifolds,
the first stack having another set of interconnected openings defining a first gas flow manifold to communicate gas flow with the first plurality of gas flow channels, and
the second stack having another set of interconnected openings defining a second gas flow manifold to communicate gas flow with the second plurality of gas flow channels.

13. The integrated condenser/separator of claim 12 wherein the first and second gas flow manifolds are aligned with the gas flow opening in the baffle plate whereby the gas flow makes one pass through the first plurality of gas flow channels and another pass through the second plurality of gas flow channels.

14. The integrated condenser/separator of claim 13 wherein the gas flow inlet opens into the first gas flow chamber whereby the gas flow makes a first pass from the first gas flow chamber through the first plurality of gas flow channels to the first gas flow manifold, flows from the first gas flow manifold through the gas flow opening to the second gas flow manifold, and makes a second pass from the second gas flow manifold through the second plurality of gas flow channels to the second gas flow chamber.

15. An integrated condenser/separator for condensing and separating a condensate from a cathode exhaust gas flow in a fuel cell system, the condenser/separator comprising:

a housing including a gas flow inlet, a gas flow outlet, a condensate outlet, a coolant inlet, and a coolant outlet;

first and second baffle plates positioned in the housing to divide an interior of the housing into a first, second, and a third gas flow chambers, each of the baffle plates having a coolant opening to allow a flow of coolant through the baffle plate and a gas flow opening to allow a gas flow through the baffle plate;

a first condensate drain in the first gas flow chamber to drain condensate from the first gas flow chamber;

a second condensate drain in the second gas flow chamber to drain condensate from the second gas flow chamber; and a plurality of heat exchange units arranged as a first stack of the heat exchange units positioned in the first gas flow chamber, a second stack of the heat exchange units positioned in the second gas flow chamber, and a third stack of heat exchange units positioned in the third gas flow chamber, the first stack including a first plurality of coolant channels interleaved with a first plurality of gas flow channels, a first inlet manifold to direct coolant into the first plurality of coolant channels, a first outlet manifold to receive coolant from the first plurality of coolant channels, and a first gas flow manifold to communicate gas flow with the first plurality of gas flow channels, the second stack including a second plurality of coolant channels interleaved with a second plurality of gas flow channels, a second inlet manifold to direct coolant into the second plurality of coolant channels, a second outlet manifold that receives coolant from the second plurality of coolant channels, and a second gas flow manifold to communicate gas flow with the second plurality of gas flow channels, the third stack including a third plurality of coolant channels interleaved with a third plurality of gas flow channels, a third inlet manifold to direct coolant into the third plurality of coolant channels, a third outlet manifold that receives coolant from the third plurality of coolant channels, and a third gas flow manifold to communicate gas flow with the third plurality of gas flow channels, the first outlet manifold and the second inlet manifold aligned with the coolant opening in the baffle plate to allow coolant flow from the first outlet manifold to the second inlet manifold whereby the coolant makes a first pass through the first plurality of coolant channels and a second pass through the second plurality of coolant channels, and the second outlet manifold and the third inlet manifold are aligned with the coolant opening in the second baffle plate to allow coolant flow from the second outlet manifold to the third inlet manifold whereby the coolant makes a third pass through the third plurality of coolant channels.

16. The integrated condenser/separator of claim 15 wherein the gas flow inlet opens into the first gas flow chamber, the first and second gas flow manifolds are aligned with the gas flow opening in the first baffle plate, and the third gas flow manifold is blocked by an imperforate portion of the second baffle plate whereby the gas flow makes a first pass from the first gas flow chamber through the first plurality of gas flow channels to the first gas flow manifold, flows from the first gas flow manifold through the gas flow opening in the opening baffle plate to the second gas flow manifold, makes a second pass from the second gas flow manifold through the second plurality of gas flow channels to the second gas flow chamber, flows from the second gas flow chamber through the gas flow opening in the second baffle plate to the third gas flow chamber, and makes a third pass from the third gas flow chamber through the third plurality of gas flow channels to the third gas flow manifold.

17. An integrated condenser/separator for condensing and separating a condensate from a cathode exhaust gas flow in a fuel cell system, the condenser/separator comprising:

a housing including a gas flow inlet, a gas flow outlet, a condensate outlet, a coolant inlet, and a coolant outlet;

a baffle plate positioned in the housing to divide an interior of the housing into a first gas flow chamber and a second gas flow chamber, the baffle plate having a coolant opening to allow a flow of coolant through the baffle plate and a gas flow opening to allow a gas flow through the baffle plate;

a first condensate drain in the first gas flow chamber to drain condensate from the first gas flow chamber; and a plurality of heat exchange units arranged as a first stack of the heat exchange units positioned in the first gas flow chamber and a second stack of the heat exchange units positioned in the second gas flow chamber, each heat exchange unit comprising a pair of plates sealing joined at peripheral edges to define a coolant channel in each said unit, the first stack having a first plurality of the coolant channels and the second stack having a second plurality of the coolant channels, the heat exchange units being spaced from each other to define a plurality of gas flow channels between the heat exchange units, the first stack having a first plurality of the gas flow channels interleaved with the first plurality of coolant channels, the second stack having a second plurality of the gas flow channels interleaved with the second plurality of coolant channels;

the heat exchange units of the first stack having respective sets of interconnected openings defining a first inlet manifold to direct coolant into the first plurality of coolant channels and a first outlet manifold to receive coolant from the first plurality of coolant channels, the heat exchange units of the second stack having respective sets of interconnected openings defining a second inlet manifold to direct coolant into the second plurality of coolant channels and a second outlet manifold that receives coolant from the second plurality of coolant channels, the first outlet manifold and the second inlet manifold aligned with the coolant opening in the baffle plate to allow coolant flow from the first outlet manifold to the second inlet manifold whereby the coolant makes a first pass through the first plurality of coolant channels and a second pass through the second plurality of coolant channels, the first stack having another set of interconnected openings defining a first gas flow manifold to communicate gas flow with the first plurality of gas flow channels, and the second stack having another set of interconnected openings defining a second gas flow manifold to communicate gas flow with the second plurality of gas flow channels.

18. The integrated condenser/separator of claim 17 wherein the first and second gas flow manifolds are aligned with the gas flow opening in the baffle plate whereby the gas flow makes one pass through the first plurality of gas flow channels and another pass through the second plurality of gas flow channels.

19. The integrated condenser/separator of claim 18 wherein the gas flow inlet opens into the first gas flow chamber whereby the gas flow makes a first pass from the first gas flow chamber through the first plurality of gas flow channels to the first gas flow manifold, flows from the first gas flow manifold through the gas flow opening to the second gas flow manifold, and makes a second pass from the second gas flow manifold through the second plurality of gas flow channels to the second gas flow chamber.

20. The integrated condenser/separator of claim 17 further comprising:
a second baffle plate positioned in the housing to divide the interior of the housing into a third gas flow chamber adjacent the second gas flow chamber, the second baffle plate having a second coolant opening to allow a flow of coolant through the second baffle plate and a second gas flow opening to allow a gas flow through the second baffle plate;
a second condensate drain in the second gas flow chamber to drain condensate from the second gas flow chamber; and
a third stack of the heat exchange units positioned in the third gas flow chamber,
the third stack including a third plurality of the coolant channels interleaved with a third plurality of gas flow channels,
the heat exchange units of the third stack having respective sets of interconnected openings defining a third inlet manifold to direct coolant into the third plurality of coolant channels and a third outlet manifold to receive coolant from the third plurality of coolant channels,
the second outlet manifold and the third inlet manifold aligned with the second coolant opening in the second baffle plate to allow coolant flow from the second outlet manifold to the third inlet manifold whereby the coolant makes a third pass through the third plurality of coolant channels,
the third stack having another set of interconnected openings defining a third gas flow manifold to communicate gas flow with the third plurality of gas flow channels.

21. An integrated condenser/separator for condensing and separating a condensate from a cathode exhaust gas flow in a fuel cell system, the condenser/separator comprising:
a housing including a gas flow chamber, a gas flow inlet, a gas flow outlet, a condensate outlet, a coolant inlet, and a coolant outlet;
a condensate drain in the gas flow chamber to drain condensate from the gas flow chamber;
a stack of heat exchange units positioned in the gas flow chamber and having a plurality of coolant channels interleaved with a plurality of gas flow channels, an inlet manifold to direct coolant into the plurality of coolant channels, an outlet manifold to receive coolant from the plurality of coolant channels, and a gas flow manifold to communicate gas flow with the plurality of gas flow channels; and
a coalescing member positioned in at least one of the gas flow chamber and the gas flow inlet upstream of the plurality of gas flow channels.

22. An integrated condenser/separator for condensing and separating a condensate from a cathode exhaust gas flow in a fuel cell system, the condenser/separator comprising:
a housing including a gas flow chamber, a gas flow inlet, a gas flow outlet, a condensate outlet, a coolant inlet, and a coolant outlet;
a condensate drain in the gas flow chamber to drain condensate from the gas flow chamber;
a stack of heat exchange units positioned in the gas flow chamber and having a plurality of coolant channels interleaved with a plurality of gas flow channels, an inlet manifold to direct coolant into the plurality of coolant channels, an outlet manifold to receive coolant from the plurality of coolant channels, and a gas flow manifold to communicate gas flow with the plurality of gas flow channels; and
a condensate manifold in fluid communication with the condensate outlet and the drain to direct condensate from the condensate drain to the condensate outlet, the condensate manifold including a wall that surrounds a wall of the gas flow chamber to define an exterior surface of the housing.

* * * * *